(12) United States Patent
Sanderson et al.

(10) Patent No.: US 11,467,880 B2
(45) Date of Patent: Oct. 11, 2022

(54) METHOD FOR ACCESSING SHARED RESOURCES OF A COMPUTER PLATFORM, ASSOCIATED COMPUTER PROGRAM AND COMPUTER PLATFORM

(71) Applicant: THALES, Courbevoie (FR)

(72) Inventors: Gordon Sanderson, Merignac (FR); Alexandre Fine, Merignac (FR)

(73) Assignee: THALES, Courbevoie (FR)

( * ) Notice: Subject to any disclaimer, the term of this patent is extended or adjusted under 35 U.S.C. 154(b) by 107 days.

(21) Appl. No.: 17/017,420

(22) Filed: Sep. 10, 2020

(65) Prior Publication Data
US 2021/0081251 A1 Mar. 18, 2021

(30) Foreign Application Priority Data
Sep. 12, 2019 (FR) ...................................... 19 10049

(51) Int. Cl.
*G06F 9/50* (2006.01)
*G06F 9/48* (2006.01)
*G06F 9/52* (2006.01)

(52) U.S. Cl.
CPC .............. *G06F 9/5066* (2013.01); *G06F 9/48* (2013.01); *G06F 9/485* (2013.01); *G06F 9/4806* (2013.01);
(Continued)

(58) Field of Classification Search
CPC ........ G06F 9/48; G06F 9/4806; G06F 9/4831; G06F 9/4837; G06F 9/485; G06F 9/4881;
(Continued)

(56) References Cited

U.S. PATENT DOCUMENTS

2005/0240932 A1 10/2005 Billau et al.
2011/0126203 A1* 5/2011 Fahrig .................. G06F 9/5077
710/48

(Continued)

FOREIGN PATENT DOCUMENTS

FR 2970577 A1 7/2012

OTHER PUBLICATIONS

Kinnan, L., et al., "Porting Applications to an ARINC 653 Complaint IMA Platform Using Vxworks as an Example," Digital Avionics Systems Conference, XP010765111, pp. 1-5 , (Oct. 24, 2004).

(Continued)

*Primary Examiner* — Charles M Swift
(74) *Attorney, Agent, or Firm* — ArentFox Schiff LLP

(57) ABSTRACT

A method for access to the shared resources of a computer platform including a multicore processor, shared resources between first partitions according to which requests to access the shared resources emitted by the first partitions are sent to a second partition that, during its execution on the processor, performs said accesses;
  multiple cores are reserved synchronously for the execution of the second access partition during a predetermined time;
  the separate accesses to separate shared resources done by the second partition having to be done by separate reserved cores; and
  all of the accesses to a shared resource done by the second access partition having to be executed, during said predetermined time, by a single core among the reserved cores.

9 Claims, 4 Drawing Sheets

(52) U.S. Cl.
CPC .......... *G06F 9/4831* (2013.01); *G06F 9/4837* (2013.01); *G06F 9/4881* (2013.01); *G06F 9/4887* (2013.01); *G06F 9/50* (2013.01); *G06F 9/5005* (2013.01); *G06F 9/5022* (2013.01); *G06F 9/5027* (2013.01); *G06F 9/5038* (2013.01); *G06F 9/5061* (2013.01)

(58) Field of Classification Search
CPC ........ G06F 9/4887; G06F 9/50; G06F 9/5005; G06F 9/5022; G06F 9/5027; G06F 9/5038; G06F 9/5061; G06F 9/5066; G06F 9/5077; G06F 9/52; G06F 13/1663
See application file for complete search history.

(56) References Cited

U.S. PATENT DOCUMENTS

| | | | | |
|---|---|---|---|---|
| 2011/0138157 | A1* | 6/2011 | Ni | G06F 30/00 712/225 |
| 2012/0054740 | A1* | 3/2012 | Chakraborty | G06F 9/45558 718/1 |
| 2014/0181828 | A1* | 6/2014 | Bird | G06F 9/5016 718/103 |
| 2018/0336068 | A1* | 11/2018 | Sandstrom | G06F 9/546 |

OTHER PUBLICATIONS

Mallachieve, K.M. et al., "Design and Architecture of Real-time Operating System," Proceedings of the Institute for the System Programming of The RAS, vol. 28, No. 2, XP055718994, pp. 181-192, (Jan. 1, 2016).

Gomes, B., et al., "Air Hypervisor Using RTEMS SMP", European Workshop on On-Board Data Processing (OBDP2019), URL:https://indico.esa.int/event/225/contributions/4307/attachments/3343/5387/0BDP2019-paper-GMV_Gomes_AIR_Hypervisor_using_RT EMS SMP.pdf, pp. 1-6, (Feb. 25, 2019).

* cited by examiner

METHOD FOR ACCESSING SHARED RESOURCES OF A COMPUTER PLATFORM, ASSOCIATED COMPUTER PROGRAM AND COMPUTER PLATFORM

CROSS-REFERENCE TO RELATED APPLICATIONS

This application claims priority to French Patent Application No. 19 10049, filed on Sep. 12, 2019. The disclosure of the priority application is incorporated in its entirety herein by reference.

TECHNICAL FIELD OF THE INVENTION

The invention relates to the field of application platforms including multicore processors, such as embedded avionics platforms, in particular the control of the operation of the software applications run on such platforms allowing their certification, for example of the Safety Net type.

BACKGROUND OF THE INVENTION

In particular, the invention relates to a method for accessing shared resources of a computer platform, including:
at least one multicore processor including at least two cores;
a set of application partitions executable on the processor;
a set of resources shared between said application partitions;
wherein the set of application partitions includes first partitions generating requests to access at least one shared resource of the set of shared resources, transmitting digital data to be written in said shared resources or querying said shared resource;
the use of the cores by the application partitions being organized beforehand according to a sequential list of allocations, the allocations indicating, in correspondence with the cores, predetermined partitions and times,
said method comprising the steps in which:
each core is selectively used, during a predetermined time indicated in an allocation of the list, for the execution of an application partition indicated in correspondence with the core in the allocation, and a switching is triggered of the selective use of the core, at the end of said predetermined time, toward the execution of the partition indicated in correspondence with said core in the following allocation of the sequential list of allocations during the predetermined time indicated in correspondence with said core in said following allocation.

In technical fields such as the avionics, automotive or nuclear field, it is very important to know how to determine, for each digital datum, a maximum propagation time, and thus to be able to guarantee that such a datum will be delivered from one resource to another in a limited time characterized by the maximum propagation time.

Running several software applications at the same time on a same multicore processor creates risks of contention due to the sharing of common resources (bus, memory, input and/or output peripherals): this may result in uncontrolled process execution times and therefore a loss of determinism, which is a significant obstacle for the qualification of the platforms.

The term "contention" refers to any situation in which at least one activity carried out by at least one core of a multicore processor experiences delays in its performance due to the temporal parallelism allowed by said multicore processor.

Knowing that some common resources, in particular hardware peripherals dedicated to inputs and outputs, do not support concurrent access, there is therefore a need to offer applications hosted on a multicore platform the same quality of service as in a single-core setting, in terms of the determinism without asking each application to provide a sufficient margin in its time budget to absorb the possible contentions due to the other applications accessing these same common resources.

SUMMARY OF THE INVENTION

To that end, according to a first aspect, the invention proposes a method for accessing the shared resources of a computer platform of the aforementioned type, characterized in that:
the set of application partitions including at least one second partition, called partition for access to the shared resources, said access requests emitted by the first partitions during their execution on the processor are sent to the partition for access to the shared resources;
the partition for access to the shared resources, when it is executed on the processor, carries out the access to the shared resources in order to implement the access requests to the shared resources;
in order to execute the partition for access to the shared resources, multiple cores are reserved synchronously over predetermined times via respective allocations in the sequential list of allocations, the following conditions having to be respected during each of the predetermined times allocated to said partition;
the separate accesses to shared resources done by the partition for access to the shared resources of the set are done by separate reserved cores; and
for each shared resource of the set, all of the accesses to the shared resource done by the partition for access to the shared resources are executed, during said predetermined time, by a single core among the reserved cores.

The invention thus makes it possible to reduce contentions, makes it possible to contribute to controlling processing times, with good maximum processing time limits, such that applications can be executed independently of one another and so as to maintain the incremental certification capacity in multicore settings.

In embodiments, the method for accessing shared resources of a computer platform according to the invention further includes one or more of the following features:
the partition for access to the shared resources transmits the responses provided by the shared resources to the requests, to the first partitions;
the shared resources of the set of shared resources are input and/or output peripherals of the computer platform;
the platform is an avionics platform;
predefined for each first partition relative to each shared resource is a respective frequency, and the partition for access to the shared resources, during each of its predetermined execution times, accesses said shared resource at said frequency in order to collect data provided by said shared resource in response to an access request emitted by said first partition and implemented by the partition for access to the shared resources;
said access requests emitted by the first partitions during their execution on the processor are sent to the partition for access to the shared resources by depositing them in a working memory in which the partition for access to the shared resources reads them and according to which the responses to said requests are deposited in said memory by the partition for access to the shared resources, and according to which the accesses to a first, respectively second, shared resource being executed during a predetermined time by a first, respectively second, of the reserved cores, the reading in the working memory of the access requests to the first, second, resource or the depositing in the working memory of the responses to said requests having to be done by said first, respectively reserved core during said predetermined time; and according to which based on at least the activity of the second of the reserved cores, the allocation to said second core is triggered, during said predetermined time, by at least part of the reading in the working memory of the requests to access the first resource or by the depositing in the working memory of the responses to said requests.

According to a second aspect, the present invention proposes a computer program including software instructions which, when executed by a computer, carry out a method as defined above.

According to a third aspect, the present invention proposes a computer platform including:
  at least one multicore processor including at least two cores;
  a set of application partitions executable on the processor;
  a set of resources shared between said application partitions;
  wherein the set of application partitions includes first partitions generating requests to access at least one shared resource of the set of shared resources, transmitting digital data to be written in said shared resources or querying said shared resource;
  including a sequential list of allocations organizing the use of the cores by the application partitions beforehand, the allocations indicating, in correspondence with the cores, predetermined partitions and times,
  said platform being suitable for using each core is selectively during a predetermined time indicated in an allocation of the list for the execution of an application partition indicated in correspondence with the core in the allocation,
  said platform being suitable for triggering a switching of the selective use of the core, at the end of said predetermined time, toward the execution of the partition indicated in correspondence with said core in the following allocation of the sequential list of allocations during the predetermined time indicated in correspondence with said core in said following allocation;
  said platform being characterized in that the set of application partitions includes at least one second partition, called partition for access to the shared resources, said access requests emitted by the first partitions during their execution on the processor being sent to the partition for access to the shared resources;
    the partition for access to the shared resources able, when it is executed on the processor, to carry out the access to the shared resources in order to implement the access requests to the shared resources;
    said platform being able to reserve, in order to execute the partition for access to the shared resources, multiple cores synchronously over predetermined times via respective allocations in the sequential list of allocations, and to respect the following conditions during each of the predetermined times allocated to said partition:
      the separate accesses to shared resources done by the partition for access to the shared resources of the set are done by separate reserved cores; and
      for each shared resource of the set, all of the accesses to the shared resource done by the partition for access to the shared resources are executed, during said predetermined time, by a single core among the reserved cores.

BRIEF DESCRIPTION OF THE DRAWINGS

These features and advantages of the invention will appear upon reading the following description, provided solely as an example, and done in reference to the appended drawings, in which.

DETAILED DESCRIPTION

Figure 1:
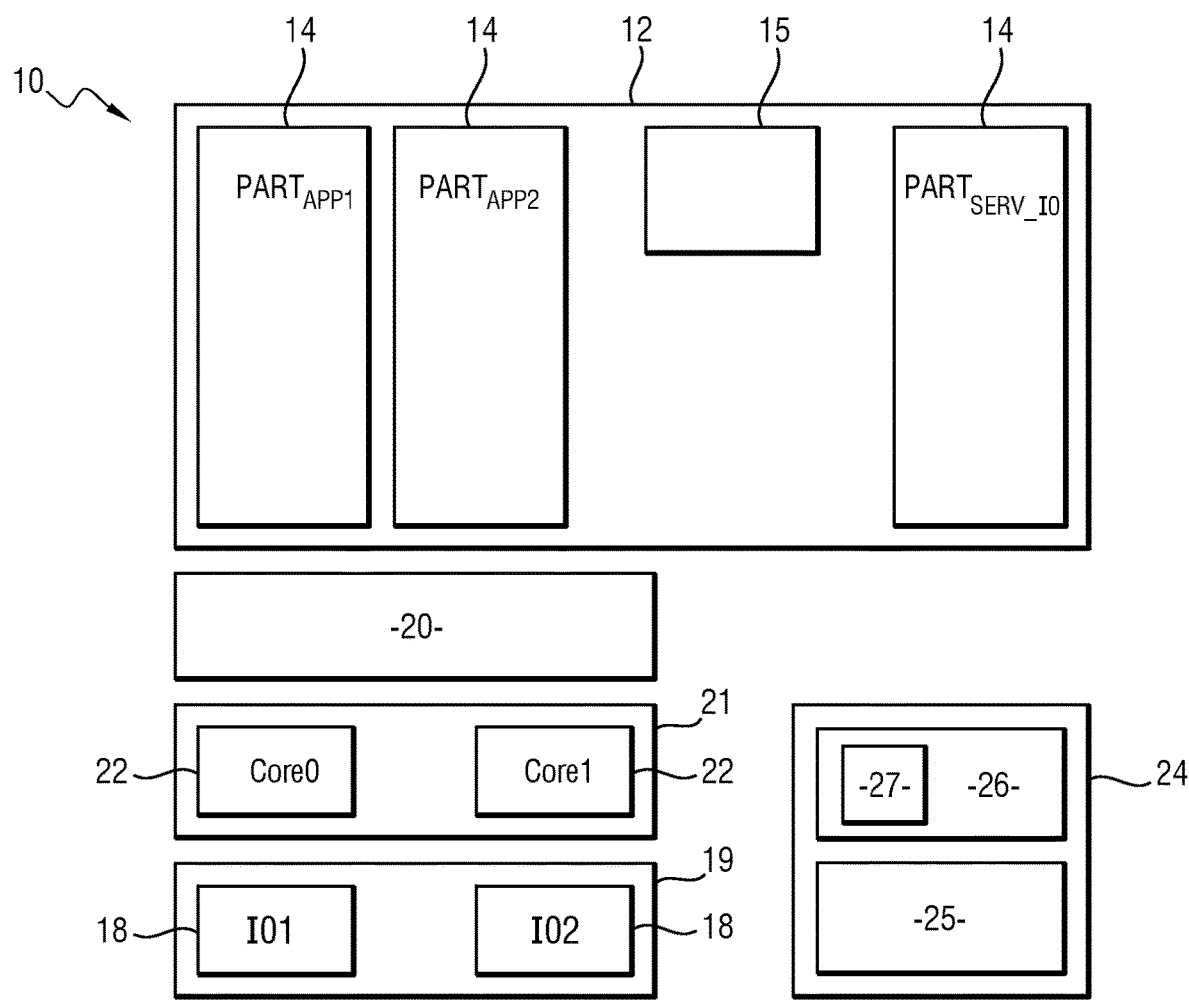
FIG. 1 shows an avionics platform in one embodiment of the invention.

FIG. 1 shows an electronic platform 10, in particular an avionics platform intended to be embedded in an aircraft, for example an airplane (in a variant, the aircraft is for example a helicopter or a drone piloted remotely by a pilot, etc.).

In the considered embodiment, the avionics platform 10 includes a memory 12, an operating system 20, a processor 21, a set 19 of input and/or output peripherals and an electronic control device 24.

The platform 10 is for example connected to other electronic systems, such as electronic avionics systems of the aircraft (e.g. radio system, flight management system, terrain awareness and warning system (TAWS), etc.).

The memory 12 stores a plurality of partitions 14.

These partitions 14 include the partitions $PART_{APPi}$, with i=1 to m, m being an integer greater than or equal to 2, which are software applications also called avionics functions and which for example fulfill various functions for the performance of a flight, some of which are critical in terms of safety, such as the braking function or the function of displaying flight parameters, the execution of each function therefore having to be robustly controlled. In the considered case, m=2: the memory stores the partitions $PART_{APP1}$ and $PART_{APP2}$ shown in FIG. 1.

According to the invention, the partitions further include a specific partition $PART_{SERV\_IO}$ 14, called partition for access to the IO peripherals. This partition $PART_{SERV\_IO}$ 14 is suitable for centralizing the exchanges with the IO peripherals 18.

A partition 14 is a program loadable into a unique addressing space in the platform 10. The platform 10, via its operating system 20 and the electronic control device 24 according to the invention, is suitable for implementing the execution of the partitions 14 and controlling the use, by a partition, of the usage time of the processor 21 such that each partition is isolated from the other partitions sharing the platform 1.

The partitions 14 are paced based on a work temporal cycle, maintained by the operating system 20.

A partition 14 includes one or several programming units, called processes, sharing the same addressing space, which can operate sequentially or in parallel and which are combined dynamically to provide the functions associated with the partition.

The processor 21, which is suitable for executing the partitions under the control of the operating system 20 and the electronic control device 24, is a multicore processor, including a plurality of cores 22, for example the cores Core0, Core1 as shown in FIG. 1, or even also in embodiments of additional cores Core2, Core3 (not shown in FIG. 1), etc.

The set 19 of input and/or output peripherals includes n input/output peripherals 18, called IO peripherals, with n an integer greater than or equal to 2.

In the considered case, the set 19 of input and/or output peripherals includes two input/output peripherals 18, the IO1 peripheral 18 and the IO2 peripheral 18.

In a known manner, the IO peripherals 18 are suitable for receiving access requests to write, respectively read, their content and for responding to these requests, by writing the data to be written and delivering a write acknowledgment, respectively by providing the read data.

The electronic control device 24 for example includes a memory 26 (which in one embodiment is part of the memory 12) and an electronic control unit 25.

The electronic control unit 25 of the electronic control device 24 is suitable for sequencing the execution of the partitions on the processor 21 based on a sequential list of allocations 27 stored for example in the memory 26. In one embodiment, the electronic control device 24 is integrated into the operating system 20, which performs the sequencing.

The allocations of the sequential list of allocations indicate, in correspondence with the cores, the partitions and the predetermined times, such that each partition is executed on the core that is allocated to it according to a given allocation, during the predetermined time as indicated in the allocation, the electronic control unit 25 being suitable so as, at the end of said time, to switch the use of the core to the execution of the partition that is allocated to said core in the following allocation of the sequential list.

The allocations are determined by said control unit 25. The predetermined times are in particular calculated based on a time allocation budgeted for each partition during the installation thereof on the platform 1, according to targeted performance objectives.

When a partition $PART_{APP1}$ 14 or $PART_{APP2}$ 14 (excluding the specific partition $PART_{SERV\_IO}$) is being executed, some processes of the implemented partition lead to the execution of commands requesting access to one, or several, IO peripheral(s) 18. According to the invention, the partitions $PART_{APP1}$ and $PART_{APP2}$ are defined such that these access commands to the IO peripherals are sent to the partition for access to the IO peripherals $PART_{SERV\_IO}$.

The partition for access to the IO peripherals $PART_{SERV\_IO}$ is suitable, during its execution on the processor 21, for providing the accesses to the IO peripherals 18, implementing, with the IO peripherals 18, the corresponding operations resulting from reading and/or writing, and for next delivering, to the partitions at the origin of these operations, the result of these operations (that is to say providing the queried data for a reading operation, providing an acknowledgment of the writing result for a writing operation).

The electronic control unit 25 is suitable for reserving, for the execution of the partition for access to the IO peripherals $PART_{SERV\_IO}$, multiple cores are reserved synchronously over predetermined times via respective allocations in the sequential list of allocations, the following conditions being respected during each of the predetermined times allocated to said partition are:

the accesses to IO peripherals 18 done by the partition for access to the IO peripherals $PART_{SERV\_IO}$ are done by separate reserved cores 22; and for each IO peripheral 18, all of the accesses to the I/O peripheral 18 done by the partition for access to the IO peripherals $PART_{SERV\_IO}$ are executed, during said predetermined time, by a single core among the reserved cores.

Figure 4:
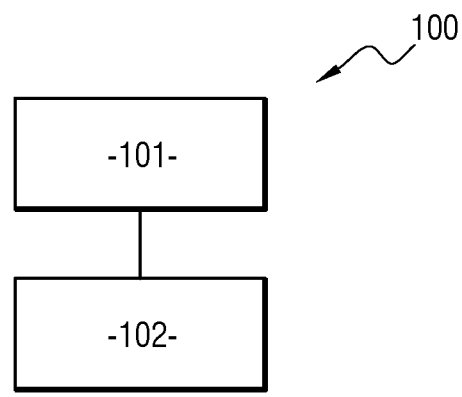
FIG. 4 illustrates the contribution of the invention relative to the solutions of the prior art.

FIG. 4 illustrates a method in one embodiment of the invention.

In a prior step 101 for design of the platform 10, at least one specific partition $PART_{SERV\_IO}$ 14, called partition for access to the IO peripherals, is created (in one embodiment, several partitions $PART_{SERV\_IO}$ are created), intended to collect all of the access commands to the IO peripherals done by avionics partitions, for example $PART_{APP1}$ and $PART_{APP2}$. The latter are defined so as to send the specific partition $PART_{SERV\_IO}$ their access commands to the IO peripherals.

The exchanges between the partition $PART_{SERV\_IO}$ for access to the IO resources and the avionics partitions $PART_{APP1}$ and $PART_{APP2}$, comprising the transmission of these commands, then the provision of the result of the implementation of these commands, are done via a memory, for example of the nondedicated volatile RAM type, referenced 15 in FIG. 1, in which the avionics partitions $PART_{APP1}$ and $PART_{APP2}$ write the access commands to the IO peripherals, in which the partition $PART_{SERV\_IO}$ reads these commands, then writes the result therein of the performance of these commands following the reading/writing in the IO peripherals indicated in the commands and lastly in which the avionics partitions $PART_{APP1}$ and $PART_{APP2}$ extract the result of their commands for access to the IO peripherals.

In one embodiment, the commands and results of commands assume the form of messages, based on the programming interface (API) of standard A653: the applications $PART_{APP1}$ and $PART_{APP2}$ acquire messages previously read by the partition $PART_{SERV\_IO}$ and push messages toward the partition $PART_{SERV\_IO}$ for the physical sending of these messages toward IO1 or IO2 during its next time allocation.

A budget in terms of use of the memory and a budget in terms of usage time of the processor (based on which the predetermined time will be set indicated in each allocation of the allocation list 27) are selectively allocated to each partition 14, $PART_{SERV\_IO}$, $PART_{APP1}$, $PART_{APP2}$: in particular, these budgets for $PART_{SERV\_IO}$ are dimensioned to allow all of the readings, writings to be handled of the IO1 18 and IO2 18 peripherals, that may be commanded by the partitions $PART_{APP1}$, $PART_{APP2}$.

In one embodiment, for each partition $PART_{APPi}$ here with i-1, 2, each APEX IO port (cf. standard ARINC 653) with partition level associated with the partition $PART_{APPi}$ can be configured, if needed, with the identifier of the partition $PART_{SERV\_IO}$, and further with the frequency of the requested activation and its shift (phase) and the Major Frame (that is to say relative to the base timeframe of duration equal to the working time cycle maintained by the operating system 20: it is thus defined, for each partition $PART_{APPi}$ and for each peripheral IOj, j=1, 2 at what frequency Fij the partition $PART_{SERV\_IO}$, while it is executed on the processor 21, will interface actively with the peripheral IOj in order to access the peripheral IOj and thus to be able to determine whether the result of readings previously commanded are available, then next to write the data in the RAM 15.

The partition for access to the IO peripherals $PART_{SERV\_IO}$ thus acts as a server and can thus serve one or several partitions, the latter not sharing ports within $PART_{SERV\_IO}$.

This configuration thus aggregates the needs expressed in the independent configurations of the partitions $PART_{APPi}$ and makes it possible to preserve the incremental aspect of the platform 10 (that is to say the platform can integrate additional applications while continuing to guarantee the determinism of the processing operations).

The partition $PART_{SERV\_IO}$ is for example configured first to process the commands (and acknowledgments) of the INPUT type (that is to say write), then next those of the OUTPUT type (write) in the IO peripherals 18. This arrangement makes it possible to minimize the acquisition latency.

In a later operational operating step of the platform 10, in reference to FIG. 2, considering the current allocation in the sequential allocation list 27 indicating that the cores 22 Core0 and Core1 are allocated specifically and synchronously to the execution of the partition for access to the IO peripherals $PART_{SERV\_IO}$ 14, the electronic control unit 25 switches the activity of these cores in order to execute this partition $PART_{SERV\_IO}$ 14, from the time T1 and during the time $t_1$ indicated in the considered allocation, by specifically allocating the core 22 Core0 to the accesses to the peripheral IO2 18 and by specifically allocating the core 22 Core1 to the accesses to the peripheral IO1 18.

The accesses to the peripherals IO1 and IO2 are thus each organized by core, thus minimizing the contentions related to the IO1 and IO2 18.

The partition $PART_{SERV\_IO}$ 14 reads, in the RAM 15, the write commands in the peripherals IO1, IO2 18 to be processed, previously deposited in the RAM 15 by the partitions $PART_{APPi}$ during their execution times; then the partition $PART_{SERV\_IO}$ 14 performs these write operations thus commanded in the peripherals IO1, IO2 18.

The partition $PART_{SERV\_IO}$ 14 reads, in the RAM 15, the read commands in the peripherals IO1, IO2 18 to be processed; the partition $PART_{SERV\_IO}$ 14 then performs these read operations thus commanded in the peripherals IO1, IO2 18. As long as the read operations requested from the IO peripherals 18 are not made available, the partition $PART_{SERV\_IO}$ 14 will listen to the peripheral IOj, j=1, 2, 18 affected by this read operation, at the defined frequency (and with the defined time phase) for this peripheral and for the partition $PART_{APPi}$ having commanded this reading. At the end of the read operation, the partition $PART_{SERV\_IO}$ 14 deposits, in the RAM 15, the read data intended for the partition $PART_{APPi}$.

As of the time $t_1$ elapsed from T1, the electronic control unit 25 switches the activity of the cores Core0, Core1 in order, during a time $t_2$ indicated in the following allocation in the sequential list of allocations 27, to execute this partition $PART_{SERV\_IO}$ 14; from the time T2, the core Core0 is dedicated to the execution of the partition $PART_{APP2}$, while the core Core1 is dedicated to the execution of the partition $PART_{APP1}$ according to the content of this allocation. During this time t2, each partition $PART_{APPi}$, i=1, 2 writes, in the RAM 15, its commands for access to the peripherals IO1, IO2 18 (in the form of messages to be emitted in the API case of standard A653) and extracts, from the RAM, the access command results previously deposited in the RAM (in the form of acquired messages in the API case of standard A653) by the partition $PART_{SERV\_IO}$ 14.

Figure 2:
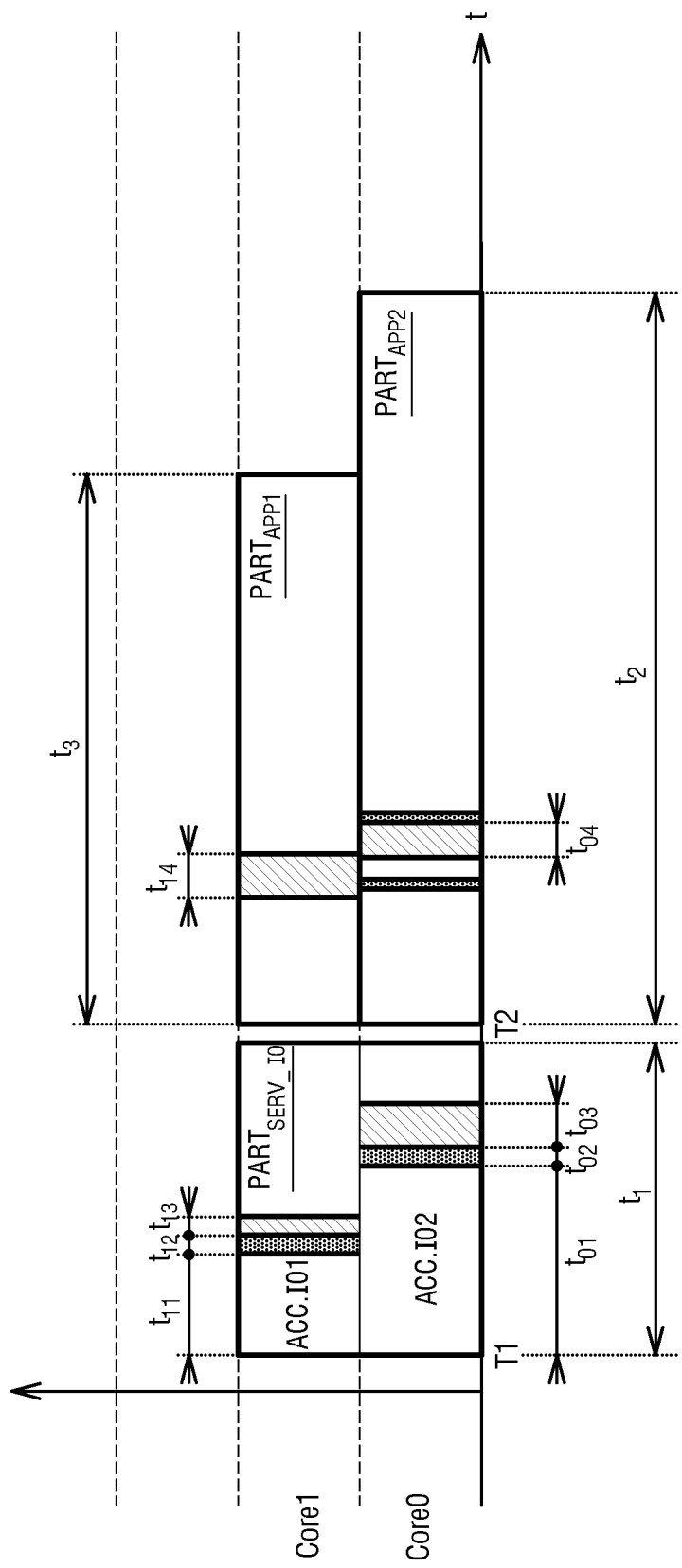
FIG. 2 is a flowchart of steps implemented in one embodiment of the invention.

FIG. 2 indicates, during the allocation time $t_1$ of the two cores Core0, Core1 to the partition $PART_{SERV\_IO}$ 14, the respective cumulative dialogue times with the peripherals IO1, IO2 18 (Free zone labeled ACC. IO1, ACC. IO2), the contention times (dotted zone) and the write/read times in RAM 15 (crosshatched zone): thus, the access to the peripheral IO1 by the partition $PART_{SERV\_IO}$ 14 has lasted for a time $t_{11}$, the contention phenomena relative to the access to the peripheral IO1 18 have lasted for a time $t_{12}$, the write/read times in RAM 15 relative to the commands and read/write results on the peripheral IO1 18 have lasted for a time $t_{13}$; similarly, the access to the peripheral IO2 by the partition $PART_{SERV\_IO}$ 14 has lasted for a time $t_{01}$, the contention phenomena relative to the access to the peripheral IO2 18 has lasted for a time toe, the read/write time in RAM 15 relative to the commands and read/write results on the peripheral IO2 18 has lasted for a time $t_{03}$.

The contention times $t_{02}$, $t_{12}$ are lower than in the solutions of the prior art; the contentions take place in the execution of the partition $PART_{SERV\_IO}$ 14.

FIG. 2 indicates, during the time $t_2$ allocated to the execution of the partition $PART_{APP2}$ on the core Core0 and in parallel to the execution of the partition $PART_{APP1}$ on the core Core1 during the time $t_3$, the write/read times in RAM 15 (crosshatched zone), the memory contention times (vertical lines) are of negligible duration of the first order (the IO data are recovered from a mailbox in CPU RAM 15 for which the bandwidth and sharing have been sized accordingly); the write/read time in RAM 15 by the partition $PART_{APP1}$ relative to the commands—and results—for access to the peripherals IO1, IO2 18 by the partition $PART_{APP1}$ has lasted a time $t_{14}$; the read/read time in RAM 15 by the partition $PART_{APP2}$ relative to the commands—and results—of reading/writing on the peripherals IO1, IO2 18 by the partition $PART_{APP2}$ has lasted a time $t_{04}$.

In the embodiment described above, two cores are used for accesses to two IO peripherals 18: the solution is of course adjustable, and a number n of cores will be used according to the invention to access n IO peripherals 18, with n any integer greater than 2.

Furthermore, the fact that the partition $PART_{SERV\_IO}$ is distributed over the n cores (n=2 in the present case) results in allowing a collaboration for the transmission of messages: in one embodiment, the exchanges with the RAM 15 relative to the data to be read or written in the RAM 15 in the context of the processing of the accesses to the peripheral IO2 are reallocated to the core Core1 by the electronic control unit 25, based on at least the load of Core1, for example in case of load imbalance, between the two cores, greater than a set threshold.

Figure 3:
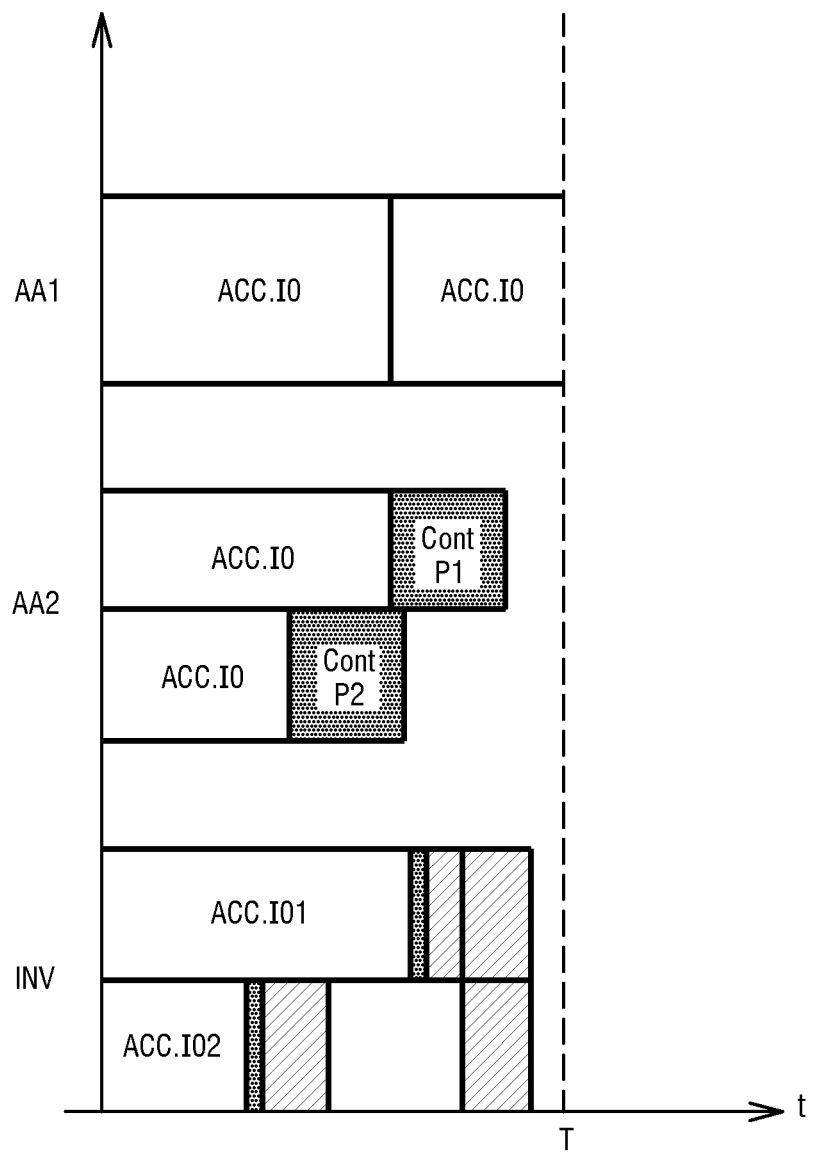
FIG. 3 illustrates the use of the cores of the platform in one embodiment of the invention.

FIG. 3 illustrates different situations. The x-axis is the time axis, and T is an execution time of the processor; the y-axis indicates three situations AA1, AA2 and INV.

In the situation AA1 of the prior art corresponding to the case of an avionics platform with a single-core processor, the partitions are executed sequentially and the CPU time taken by the partitions for the accesses to the IO peripherals is cumulative.

In the situation AA2 of the prior art corresponding to the case of an avionics platform with a multicore processor, the partitions are executed in parallel on separate cores (in FIG. 3, one line per partition), the accesses to the shared IO peripherals (ACC. IO) can become concurrent: it is necessary to provide a significant reserve in the time allocations to the partitions to account for the elongation of the access services to the IOs in light of the potential contentions (CONT P1 for one of the partitions, Cont P2 for the other partition).

According to the invention corresponding to the situation INV in FIG. 3, the contentions (dotted zones) appear to be greatly reduced relative to the prior art, the access times to the RAM 15 are shown crosshatched.

The solutions of the prior art do not make it possible to offer a satisfactory characterization of the IO access service times that do not depend on the activity of the concurrent applications on these same IOs. This is even more true for dedicated IO controllers, seen and accessed through peripherals of the SoC, which exist and do not allow evenly shared access between cores initiating IO transactions. This requires a greater characterization effort at the IMA multicore processor, but also and above all, at the level of the verification activities performed by each application that will want to be deployed on the IMA multicore platform.

In one embodiment, the memory 12, the operating system 20, the processor 21 and the electronic control device 24 are integrated into a same electronic chip (SoC or System On Chip).

In embodiments, at least some of the input and/or output peripherals 18 are outside peripherals, that is to say they are not integrated into the SoC.

In embodiments, the input and/or output peripherals 18 are also integrated into the SoC.

In one embodiment, the steps implemented by the electronic control unit 25 are the result of the execution, on a processor, of software instructions of the computer program stored in a memory. In such a case, the electronic control unit 25 then includes this memory and this processor.

In another embodiment, the electronic control unit 25 is made in the form of a programmable logic component, such as an FPGA (Field Programmable Gate Array), or in the form of a dedicated integrated circuit, such as an ASIC (Application-Specific Integrated Circuit).

The present invention thus makes it possible to share I/O resources between applications within a certified multicore avionics platform and with the incremental certification capability while guaranteeing the execution times of the applications accessing these I/Os independently of the concurrent accesses of the applications being run on the other cores of the processors, as required by standard DO-297 setting out the minimum guidelines for integrated modular avionics (IMA). To that end, the accesses to the IO peripherals are organized by grouping together the accesses to an IO peripheral by a single core, in order to reduce the software and hardware contentions.

The present invention makes it possible to retain the essential properties for an IMA platform (Incremental Certification), which are:
  extended robust partitioning, and
  incrementality;
  which requires controlling that:
    an application (or group of controlled applications) does not influence the other applications as long as it stays in the budget (time, memory, etc.) that is allocated to it;
    the times of the offered services remain controlled irrespective of the execution conditions.

This invention preserves the overall performance of the solution by further offering the avionics applications configuration capabilities for the acquisition frequencies that are specific to them and which can thus be different among applications.

The invention has been described above in an avionics context, but is of course usable in any other context.

The invention has been described in reference to the control of accesses to 10 peripherals. It is of course usable, more generally, to control the access times to any type of resources shared by the cores, aside from 10 peripherals: buses, memories, ARINC664, non-volatile memory, ARINC429 (com bus), etc.

The invention claimed is:

1. A method for accessing shared resources of a computer platform, including:
  at least one multicore processor including at least two cores;
  a set of application partitions executable on the processor;
  a set of resources shared between said application partitions;
  wherein the set of application partitions includes first partitions generating requests to access at least one shared resource of the set of shared resources, transmitting digital data to be written in said shared resources or querying said shared resource;
  the use of the cores by the application partitions being organized beforehand according to a sequential list of allocations, the allocations indicating, in correspondence with the cores, predetermined partitions and times,
  said method comprising the steps in which:
  each core is selectively used, during a predetermined time indicated in an allocation of the list, for the execution of an application partition indicated in correspondence with the core in the allocation, and a switching is triggered of the selective use of the core, at the end of said predetermined time, toward the execution of the partition indicated in correspondence with said core in the following allocation of the sequential list of allocations during the predetermined time indicated in correspondence with said core in said following allocation;
  wherein said method further comprises the following steps:
  the set of application partitions including at least one second partition, called partition for access to the shared resources, said access requests emitted by the first partitions during their execution on the processor are sent to the partition for access to the shared resources;
  the partition for access to the shared resources, when it is executed on the processor, carries out the access to the shared resources in order to implement the access requests to the shared resources;
  in order to execute the partition for access to the shared resources, multiple cores are reserved synchronously over predetermined times via respective allocations in the sequential list of allocations, the following conditions having to be respected during each of the predetermined times allocated to said partition:
  the separate accesses to shared resources done by the partition for access to the shared resources of the set are done by separate reserved cores; and
  for each shared resource of the set, all of the accesses to the shared resource done by the partition for access to the shared resources are executed, during said predetermined time, by a single core among the reserved cores; and
  wherein predefined for each first partition relative to each shared resource is a respective frequency, and the partition for access to the shared resources, during each of its predetermined execution times, accesses said shared resource at said frequency in order to collect data provided by said shared resource in response to an access request emitted by said first partition and implemented by the partition for access to the shared resources.

2. The method for access to shared resources of a computer platform according to claim 1, wherein the partition for access to the shared resources transmits the responses provided by the shared resources to the requests, to the first partitions.

3. The method for access to shared resources of a computer platform according to claim 1, wherein the shared resources of the set of shared resources are input or output peripherals of the computer platform.

4. The method for access to shared resources of a computer platform according to claim 1, wherein the platform is an avionic platform.

5. The method for access to shared resources of a computer platform according to claim 1, wherein said access requests emitted by the first partitions during their execution on the processor are sent to the partition for access to the shared resources by depositing them in a working memory in which the partition for access to the shared resources reads them and according to which the responses to said requests are deposited in said memory by the partition for access to the shared resources, and according to which the accesses to a first, respectively second, shared resource being executed during a predetermined time by a first, respectively second, of the reserved cores, the reading in the working memory of the access requests to the first, second, resource or the depositing in the working memory of the responses to said requests having to be done by said first, respectively reserved core during said predetermined time; and according to which based on at least the activity of the second of the reserved cores, the allocation to said second core is triggered, during said predetermined time, by at least part of the reading in the working memory of the requests to access the first resource or by the depositing in the working memory of the responses to said requests.

6. A computer program stored on a non-transitory computer readable storage medium, the computer program including software instructions which, when executed by the computer, carry out the method according to claim 1.

7. A computer platform including:
at least one multicore processor including at least two cores;
a set of application partitions executable on the processor;
a set of resources shared between said application partitions;
wherein the set of application partitions includes first partitions generating requests to access at least one shared resource of the set of shared resources, transmitting digital data to be written in said shared resources or querying said shared resource;
including a sequential list of allocations organizing the use of the cores by the application partitions beforehand, the allocations indicating, in correspondence with the cores, predetermined partitions and times,
said platform being suitable for using each core is selectively during a predetermined time indicated in an allocation of the list for the execution of an application partition indicated in correspondence with the core in the allocation,
said platform being suitable for triggering a switching of the selective use of the core, at the end of said predetermined time, toward the execution of the partition indicated in correspondence with said core in the following allocation of the sequential list of allocations during the predetermined time indicated in correspondence with said core in said following allocation;
wherein the set of application partitions includes at least one second partition, called partition for access to the shared resources, said access requests emitted by the first partitions during their execution on the processor being sent to the partition for access to the shared resources;
the partition for access to the shared resources able, when it is executed on the processor, to carry out the access to the shared resources in order to implement the access requests to the shared resources;
said platform being able to reserve, in order to execute the partition for access to the shared resources, multiple cores synchronously over predetermined times via respective allocations in the sequential list of allocations, and to respect the following conditions during each of the predetermined times allocated to said partition:
the separate accesses to shared resources done by the partition for access to the shared resources of the set are done by separate reserved cores; and
for each shared resource of the set, all of the accesses to the shared resource done by the partition for access to the shared resources are executed, during said predetermined time, by a single core among the reserved cores; and
wherein predefined for each first partition relative to each shared resource is a respective frequency, and the partition for access to the shared resources, during each of its predetermined execution times, accesses said shared resource at said frequency in order to collect data provided by said shared resource in response to an access request emitted by said first partition and implemented by the partition for access to the shared resources.

8. The computer platform according to claim 7, wherein the partition for access to the shared resources is suitable for transmitting the responses provided by the shared resources to the requests, to the first partitions.

9. The computer platform according to claim 7, wherein the shared resources of the set of shared resources are input or output peripherals of the computer platform.

* * * * *